United States Patent [19]
Corrigan

[11] Patent Number: 5,264,008
[45] Date of Patent: Nov. 23, 1993

[54] REFORMER SEAL PLATE

[75] Inventor: Thomas J. Corrigan, Vernon, Conn.

[73] Assignee: United Technologies Corporation, Hartford, Conn.

[21] Appl. No.: 772,758

[22] Filed: Oct. 7, 1991

[51] Int. Cl.$^5$ .............................. B01J 7/00; B01J 8/06
[52] U.S. Cl. ...................................... 48/94; 48/127.9; 422/197; 422/204; 422/205
[58] Field of Search ............... 422/196, 197, 202, 203, 422/204, 205; 48/94, 127.9; 429/17, 19

[56] References Cited
U.S. PATENT DOCUMENTS

| | | | |
|---|---|---|---|
| 4,071,330 | 1/1978 | Sederquist | 48/94 |
| 4,325,916 | 4/1982 | Worley | 422/197 |
| 4,921,680 | 5/1990 | Bonk et al. | 422/197 |

Primary Examiner—Peter Kratz
Attorney, Agent, or Firm—Edward L. Kochey, Jr.

[57] ABSTRACT

A seal plate within a gas fixed reformer divides an upper plenum and a lower plenum to force combustion products along the heat exchange surface of the reactors. The seal plate has a sealed horizontal central portion and a vertical perpendicular portion extending to the bottom of the shell. The entire seal plate is exposed to gas in the discharge plenum, whereby differential expansion of various seal plate portions is avoided.

4 Claims, 3 Drawing Sheets

REFORMER SEAL PLATE

DESCRIPTION

1. Technical Field

The invention relates to high temperature gas reformers and in particular to a plate for sealing against heating gas bypass around the reactors

2. Background of the Invention

Hydrocarbon fuel reformers are used in fuel cell power plants. They take raw hydrocarbon fuel such as natural gas, propane, or naphtha and catalytically convert the raw fuel to a hydrogen rich fuel gas suitable for use as an anode fuel. Raw fuel is percolated through catalyst beds which are contained in tubes mounted within the reformer housing.

Catalytic conversion is carried out at elevated temperatures in the range of 800 F. to 1700 F. The reformer includes a pressure vessel as the reformer shell within which a burner is operated to establish these elevated temperatures.

Reactors are in the form of bayonet tubes with an upward flow in the outer portion through the catalyst bed and a downward flow through the inner portion, providing some counterflow heat recovery to the reformed gas from the incoming gas. The flue gas passes in heat exchange relationship with the outer surface of the bayonet tubes. It is maintained in close contact therewith by surrounding sleeves with a baffle or seal plate forcing the flue gas through its allotted area.

This baffle has been a substantially horizontal plate sealed at the burner and reactor penetrations. The baffle has continued radially out where it was sealed to the shell. It therefore experiences high temperature near the center where it is exposed to the hot gasses. At the periphery it approaches shell temperature.

The thermal expansion causes the center to grow with respect to the periphery. A resulting wrinkled sheet is thereby formed as the center buckles because of the expansion. Sealing of this buckled plate at the burner and reactor openings has therefore been difficult.

SUMMARY OF THE INVENTION

The impervious shell of a bottom supported gas fired reformer is comprised of a shell bottom plate, a cylindrical shell housing, and a shell head. A plurality of bayonet type reactors are annularly arranged within the shell. Each reactor has a central tube for the downflow of reformer gas and an outer casing forming an annulus for the upflow of reformer gas.

A burner is centrally located within the shell and supported from the center of the bottom plate. Combustion products pass up through a liner and down for contact with the bayonet tubes. The product flow is confined to an annulus around each tube, with bypass being blocked by a seal plate.

The seal plate passes horizontally through the area of the reactor and burner penetration and is sealed thereto. The outer periphery of the seal plate passes down toward the shell bottom plate as a cylinder. It is located inside the shell insulation and is in contact with outlet combustion products both at the horizontal and vertical portions. Temperature difference and concomitant buckling are avoided.

DESCRIPTION OF THE PREFERRED EMBODIMENT

Figure 1:
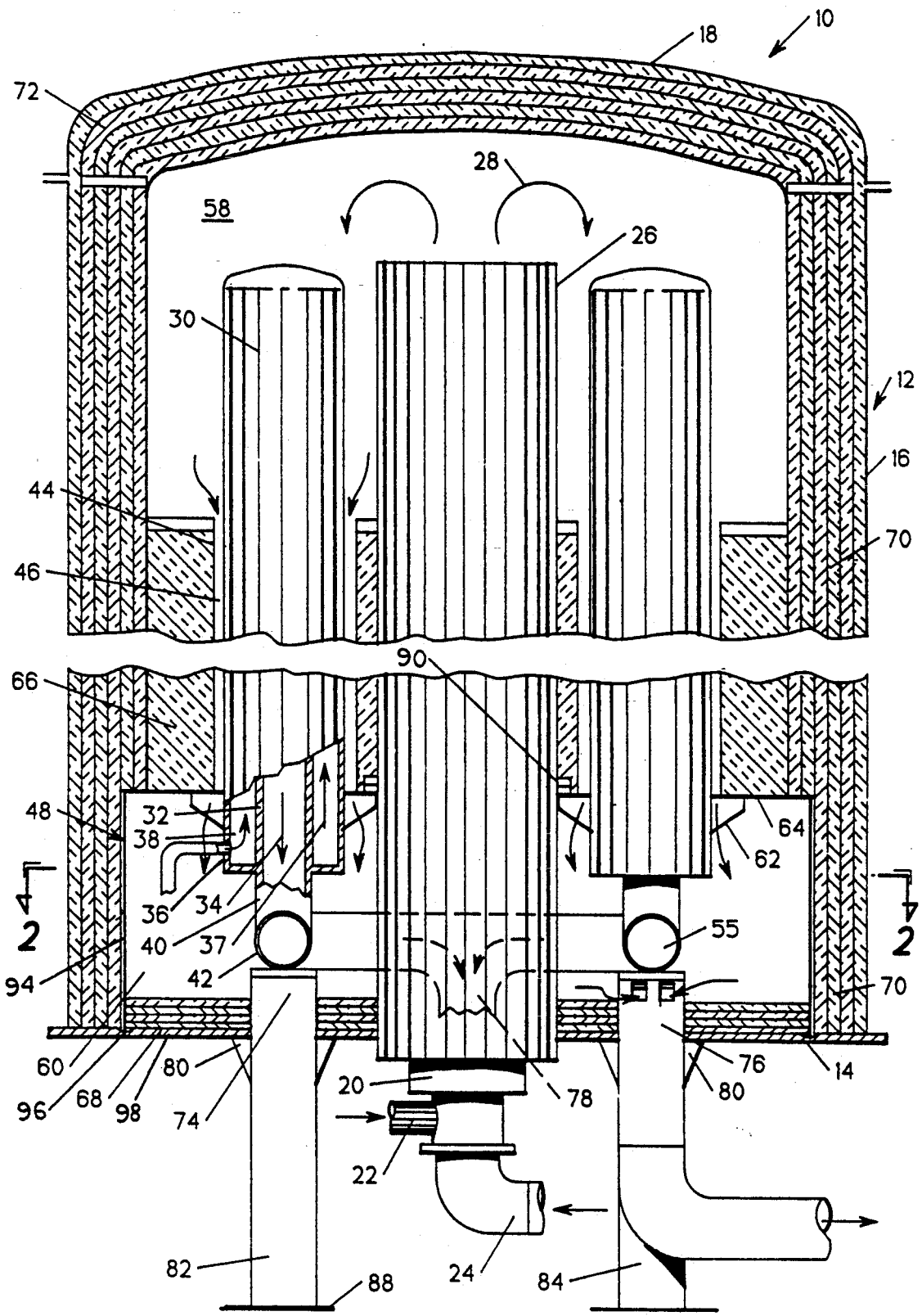
FIG. 1 is a sectional side elevation through the reformer.

Referring to FIG. 1, the gas reformer 10 includes an impervious shell 12 formed of a shell bottom plate 14, a cylindrical shell housing 16 and a shell head 18. These are welded or bolted together at flanged connections and the shell functions to contain the combustion products from burner 20.

This burner has a fuel inlet 22 and an air inlet 24 and is centrally supported from the bottom plate 14. Combustion products pass through liner 26 and outwardly as shown by arrows 28 from the top of the burner tube.

Figure 2:
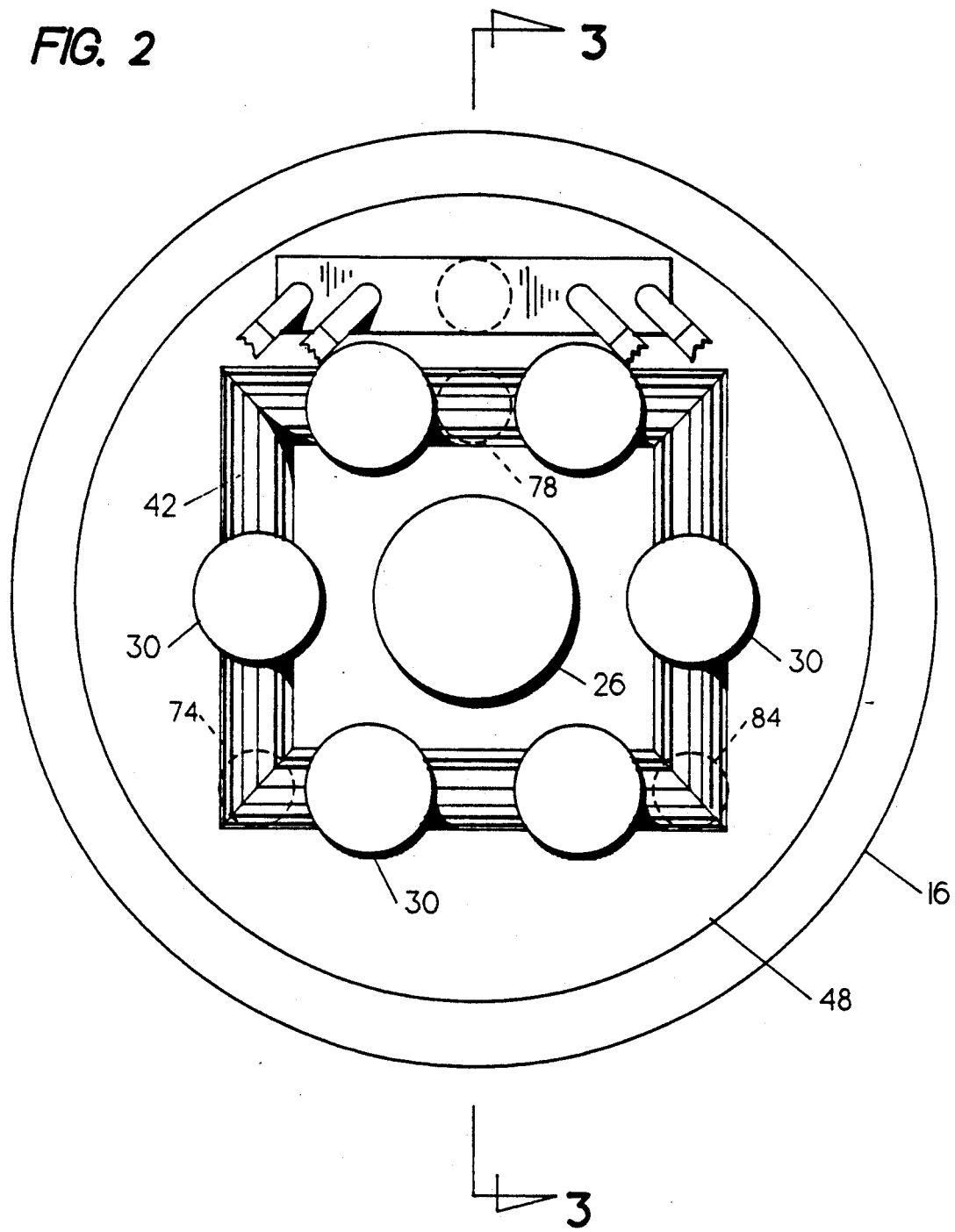
FIG. 2 is a sectional top view through the reformer.

A plurality of bayonet type reactors 30 are located within the shell, the annular arrangement of these being best seen in FIG. 2. Each reactor has a central tube 32 for the downflow 34 of reformer gas. An outer casing 36 forms an annular space 38 for the upflow of reformer gas. Plate 37 supports the catalyst.

An outlet tube extension 40 carries the reformer gas to a reformer gas outlet header 42 located below and passing beneath all of reactors 30. This outlet tube extension is directly connected to the outlet header and supports the reactors from the outlet header.

A sleeve 44 surrounds the lower portion of each reactor for the purpose of confining the flow of combustion products to the annular space or fluid flow path 46. This space includes spiral rods to facilitate the mixing of the combustion products and to increase the heat transfer coefficient. This sleeve cooperating with baffle or seal plate 48 located in parallel with flowpath 46, forces the combustion products to pass from upper gas plenum 58 to the outlet plenum 60 through the annular space 46, in heat exchange relationship with the reactors.

Figure 3:
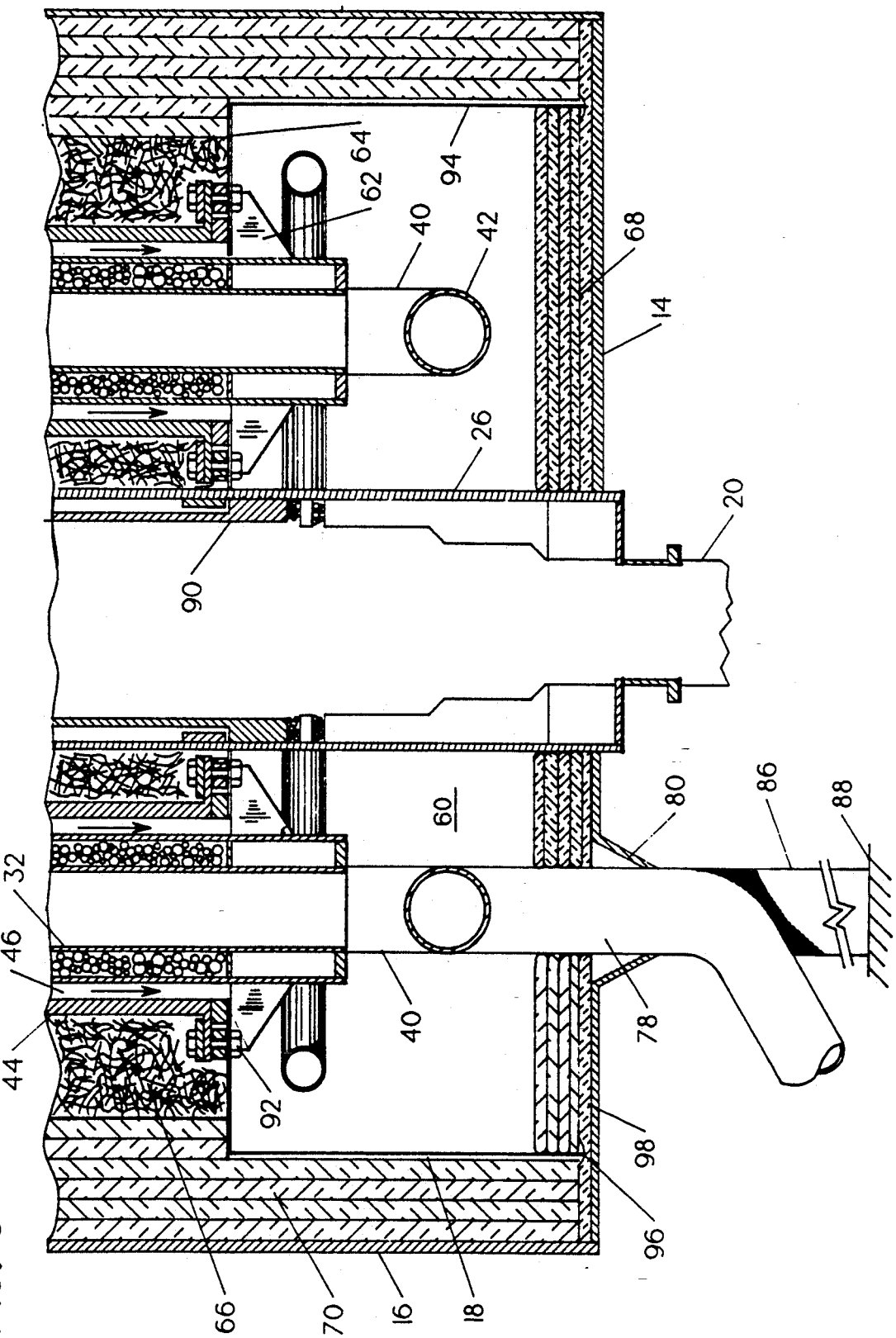
FIG. 3 is a sectional side elevation through the lower portion of the reformer.

As shown in more detail in FIG. 3, support leg 62 on each reactor supports the horizontal portion 64 of the seal plate. This seal plate in turn supports the sleeves 44 as well as loose fill insulation 66.

Shell bottom plate 14 is protected from the 770 F. gas in outlet plenum 60 by blanket insulation 68. The cylindrical shell housing 16 and head 18 are protected from the interior gases by insulation 70 and 72.

Three outlet header support members 74, 76 and 78 support the outlet header 42 and pass directly down to bottom plate 14 where they are welded to the plate through thermal sleeves 80. These thermal sleeves accommodate the local differential expansion between the support member and the bottom plate and provide a gradual thermal gradient. They also provide some flexibility for relative horizontal movement of the support members with respect to the bottom plate. They are, however, stiff in the vertical direction so that they transmit load in this direction between the support members 74, 76 and 78 and the bottom plate 14. Outlet header support continuation members 82, 84 and 86 extend directly downwardly from the outlet header support members to a ground support location 88.

The central horizontal portion 64 of seal plate 48 is sealed to the burner liner by compression joint 90.

Sleeves 44 are sealed to the plate by the slidable bolted connection 92. Combustion products are to be forced through annular space 46 into outlet plenum 60.

Seal plate 48 passes down toward shell bottom plate 14, by a vertical peripheral portion or cylindrical extension 94. The plate is inside insulation 70, being exposed to combustion products in plenum 60 throughout both the vertical and horizontal portions. Significant temperature differential and resulting buckling are avoided.

The lower edge 96 of the cylindrical extension 92 abuts a bat of insulation 98. This seals against gas bypass between the shell and the seal plate.

Vertical movement can be accommodated by flexibility of the insulation. Little movement is expected, however. Gas loading on the seal plate by the pressure differential across it tends to maintain contact. The temperature of plate 92 approaches exit combustion product temperature. The reformer outlet piping between sleeve 80 and the seal support 72 is approximately the same temperature. Relative vertical movement of edge 96 is therefore minimal.

The seal plate of this construction also protects vertical portions of the insulation from gas erosion and deterioration. The load carrying ability of the seal plate is also enhanced.

I claim:

1. A gas fired reformer arrangement comprising:
   a shell having a top and a bottom;
   a burner supported from said shell and firing into an upper plenum within said shell;
   a plurality of reformer gas reactors located within said shell;
   a sleeve concentrically surrounding a portion of each gas reactor, forming an annular space between each gas reactor and the sleeve surrounding said each gas reactor;
   a lower combustion gas exit plenum located below said reactors;
   means forming a fluid flow path for conducting combustion gas from said upper plenum to said lower combustion gas exit plenum including said annular space and passing in heat exchange relationship with said reactors;
   a seal plate for blocking flow through a leakage path between said upper plenum and said lower plenum in parallel flow relationship with said fluid flow path for preventing gas bypass around said fluid flow path; and
   said seal plate having a central horizontal portion sealingly connected to each said sleeve, and a vertical peripheral portion extending down to the bottom of said shell.

2. A gas fired reformer arrangement as in claim 1 having also:
   said seal plate substantially fully exposed to said lower plenum, whereby said seal plate is substantially all at the same temperature.

3. A gas fired reformer arrangement as in claim 1, further comprising:
   said burner located in the bottom of said shell and extending up into an upper plenum within said shell;
   said seal plate having a central horizontal portion also sealingly connected to said burner.

4. A gas fired reformer arrangement as in claim 3 having also:
   said seal plate substantially fully exposed to said lower plenum, whereby said seal plate is substantially all at the same temperature.

* * * * *